(12) United States Patent
McAuliffe et al.

(10) Patent No.: US 9,270,185 B2
(45) Date of Patent: Feb. 23, 2016

(54) SWITCHED MODE POWER SUPPLY

(75) Inventors: Conor McAuliffe, Dublin (IE); Paul Grogan, Dublin (IE)

(73) Assignee: IKON SEMICONDUCTOR LIMITED, Dublin (IE)

( * ) Notice: Subject to any disclaimer, the term of this patent is extended or adjusted under 35 U.S.C. 154(b) by 284 days.

(21) Appl. No.: 14/118,069

(22) PCT Filed: May 11, 2012

(86) PCT No.: PCT/EP2012/058823
§ 371 (c)(1),
(2), (4) Date: Nov. 15, 2013

(87) PCT Pub. No.: WO2012/156329
PCT Pub. Date: Nov. 22, 2012

(65) Prior Publication Data
US 2014/0132179 A1    May 15, 2014

(30) Foreign Application Priority Data

May 18, 2011    (GB) .................................. 1108273.2

(51) Int. Cl.
| | | |
|---|---|---|
| G05F 1/00 | (2006.01) | |
| H05B 37/02 | (2006.01) | |
| H05B 39/04 | (2006.01) | |
| H05B 41/36 | (2006.01) | |
| H02M 3/335 | (2006.01) | |
| H02M 3/156 | (2006.01) | |
| H05B 33/08 | (2006.01) | |
| H02M 1/00 | (2007.01) | |

(52) U.S. Cl.
CPC .......... *H02M 3/33523* (2013.01); *H02M 3/156* (2013.01); *H02M 3/33507* (2013.01); *H05B 33/0815* (2013.01); *H02M 2001/0009* (2013.01); *Y02B 20/346* (2013.01)

(58) Field of Classification Search
USPC ........................................ 315/291; 363/21.15
See application file for complete search history.

(56) References Cited

U.S. PATENT DOCUMENTS

| 7,505,287 | B1 | 3/2009 | Kesterson | |
|---|---|---|---|---|
| 8,848,399 | B2 * | 9/2014 | Sagneri ................. | H02M 3/158 363/21.02 |
| 2010/0225249 | A1 | 9/2010 | Liao et al. | |
| 2012/0081029 | A1 | 4/2012 | Choi et al. | |
| 2013/0193940 | A1 * | 8/2013 | Louvel .................. | H02M 3/156 323/282 |
| 2014/0016373 | A1 * | 1/2014 | Zhang ............... | H02M 3/33523 363/21.15 |
| 2014/0098576 | A1 * | 4/2014 | Schroeder gen Berghegger ...... | H02M 3/33523 363/21.04 |
| 2014/0132179 | A1 * | 5/2014 | McAuliffe ............ | H02M 3/156 315/291 |
| 2014/0240051 | A1 * | 8/2014 | Buono .................... | H03F 3/183 330/297 |
| 2014/0268889 | A1 * | 9/2014 | Scott ..................... | H02M 3/285 363/15 |
| 2015/0117063 | A1 * | 4/2015 | Rivet ...................... | H02M 1/08 363/17 |
| 2015/0200598 | A1 * | 7/2015 | Kha .................. | H02M 3/33523 363/17 |
| 2015/0244274 | A1 * | 8/2015 | Fahlenkamp ..... | H02M 3/33507 363/21.15 |
| 2015/0256060 | A1 * | 9/2015 | Faingersh ............. | H02M 3/156 323/267 |

(Continued)

FOREIGN PATENT DOCUMENTS

| DE | 102005040876 | 3/2007 |
|---|---|---|
| EP | 2209195 | 7/2010 |
| WO | 2010/065598 | 6/2010 |

*Primary Examiner* — Adam Houston
(74) *Attorney, Agent, or Firm* — Patti & Malvone Law Group LLC

(57) ABSTRACT

The present application relates to switched mode power supplies and provides a method of control in which control is effected at the midpoint of the period in which the input switch is conducting.

35 Claims, 14 Drawing Sheets

(56) References Cited

U.S. PATENT DOCUMENTS

| | | | | |
|---|---|---|---|---|
| 2015/0280573 A1* | 10/2015 | Gong | ........... | H02M 3/33592 363/21.14 |
| 2015/0280574 A1* | 10/2015 | Gong | ........... | H02M 3/33507 363/21.12 |
| 2015/0280576 A1* | 10/2015 | Hinz | ........... | H02M 3/33507 363/21.15 |
| 2015/0280584 A1* | 10/2015 | Gong | ........... | H02M 3/33515 363/21.13 |
| 2015/0285843 A1* | 10/2015 | Michal | ........... | H02M 3/156 324/713 |

* cited by examiner

SWITCHED MODE POWER SUPPLY

CROSS REFERENCE

This application claims the benefit of PCT patent application No. PCT/EP2012/058823, filed May 11, 2012, the respective contents of which are hereby incorporated by reference in their entirety.

FIELD OF THE INVENTION

This invention relates generally to power conversion and more specifically to Switched Mode Power Supply (SMPS) controllers and the methods used therein.

BACKGROUND

A switched mode power supply (SMPS) is an electronic power supply that incorporates switching and energy storage elements so as to achieve efficient conversion of electrical power from a power source to a load. A SMPS may convert DC-DC, AC-DC or DC-AC. There are three basic configurations or topologies of dual switch, single storage element SMPS; Buck, Boost and Buck-Boost as illustrated in FIG. 1. In each case, the power delivered to the load 1 is controlled by the duty cycle of the control signal applied to the control terminal of the active switching elements (i.e. the gate of the MOSFET 4 in FIG. 1(b)). In each case, a first (input) switch 4 when switched on, transfers energy from an input source 2 to an energy storage device 3 (e.g. an inductor). The first switch 4 may be a MOSFET or similar semiconductor switching device. When the first switch 4 is turned off, a second switch 5 is employed to transfer the energy stored in the inductor to the load 1. In its simplest form, the second switch 5 is a diode or similar semiconductor device. It will be appreciated that in the exemplary circuits illustrated in FIG. 1(b) a capacitor is shown as part of the load however this is for convenience of explanation and generally the capacitor is part of the SMPS.

Broadly speaking a SMPS operates so as to transfer energy from an input power source to an output load via an energy storage element. This is achieved through the operation of the switching elements so that during the first portion of the switching cycle, energy is transferred from the input source to the energy storage element and during the second portion of the switching cycle energy is transferred from the energy storage element to the output load. The ratio of the first portion of the switching cycle to the total switching cycle is referred to as the duty cycle of the SMPS. The power delivered to the load is controlled by the duty cycle.

A SMPS may operate in one of three different modes namely: DCM (Discontinuous Conduction Mode), BCM (Boundary Conduction Mode) and CCM (Continuous Conduction Mode). In DCM, the energy storage element is reset before the end of each switching cycle. In CCM, the energy storage element is storing some energy (non zero value) at the end/start of each switching cycle. In BCM, the energy storage element is emptied (reset to zero) precisely at the end of each switching cycle. i.e. the SMPS is operating at the boundary between DCM and CCM.

An SMPS controller is a device whose purpose is to control the output quantity (typically voltage or current) delivered by the SMPS to the load by observing various quantities (typically voltages or currents) within the SMPS which may or may not include the output quantities themselves and adjusting the on and off times of one or more switches within the SMPS according to the desired mode of operation (CCM, BCM or DCM) of the SMPS.

As well as providing control for the SMPS, the controller itself might also implement other ancillary functions such as, but not limited to: controlled start-up, fault protection (over voltage, over current, over temperature), standby and sleep modes as well as any other functionality that may be required for the specific application in which the power supply is being used.

An offline AC-DC SMPS is an electronic power supply that converts an incoming AC supply voltage into a DC output. An AC-DC SMPS typically incorporates a multiplicity of switching and energy storage elements configured so as to achieve efficient conversion of electrical power from the AC mains voltage supply to a load. Generally, the AC voltage is first converted by means of a rectifier or similar circuit to a rectified form. The rectified AC voltage is used as the input to the switching stage of the SMPS. The rectifier very often is a diode bridge rectifier. A bulk capacitor is typically used to smooth the rectifier output before the SMPS. If the bulk capacitor is sufficiently large, the input to the SMPS is a pseudo-DC voltage with a ripple voltage present at twice the mains frequency. The amount of ripple depends both on the size of the bulk capacitor and the power drawn by the SMPS. In some cases it is desirable to have a small value of bulk capacitance at the output of the bridge rectifier so that the fully or near fully rectified AC mains voltage appears at the input to the SMPS.

FIG. 2 below outlines a typical arrangement for an offline AC-DC SMPS which includes a diode bridge rectifier 10, and a bulk capacitor 12 for smoothing the rectified mains. The rectified mains is provided as an input source voltage to the SMPS 14 which in turn converts it for delivery to a load 1.

In offline AC-DC SMPS converter applications, for safety reasons it is often required to have isolation between the AC mains and the load of the SMPS converter. This may be achieved in an SMPS using a transformer as the energy storage device. In lower power applications, one of the most utilised isolated SMPS converter topologies is the Flyback converter, shown in FIG. 3 which is essentially an isolated version of the Buck-Boost topology. A flyback transformer 16 achieves the required isolation between the primary and secondary sides; the transformer 16 also allows for voltage scaling by appropriate selection of the turns ratio of the transformer, which is the ratio between the number of turns on the primary winding and the number of turns on the secondary winding ($N_p:N_s$).

Additional circuitry may be included within an offline AC-DC SMPS converter for purposes other than that of actual power conversion. Thus for example, in the exemplary arrangement of FIG. 4, an EMI filter (shown in block form with protection circuitry 20) is provided to limit the transfer of switching noise onto the mains 22. Similarly, protection circuits or devices may be provided, for example, to protect against over-voltage (surge protection) and over-current protection. Typically, one or either or both the EMI filter and protection devices are placed at the front end before the diode bridge rectifier 10 in order to meet the various regulatory compliance standards required when interfacing a circuit to the AC mains supply.

As with the general offline SMPS converters described above offline SMPS converters generally include an EMI filter and some form of over-voltage/over-current protection placed at the front end, followed by a diode bridge rectifier and bulk capacitor after which is some form of SMPS converter (typically isolated), controlled so as to deliver a constant current or voltage to the load which may also have some form of filtering across it (possibly in the form of one or multiple capacitors in parallel with the load).

One difficulty with offline SMPS control is that since isolation is generally required, the observation and feedback of secondary side quantities to the primary side are more complex due to the requirement to maintain the isolation barrier. One solution is to employ an isolated feedback device such as either an optical, capacitive or inductive based couplers circuits to provide isolated feedback to the controller of measurements from the secondary side, for example output voltage, output current or both. The use of isolated feedback devices is not ideal. For example, opto-couplers are a known weakness in isolated SMPS systems as they age badly; especially at higher temperatures, thus leading to a degradation of performance and accuracy over time as well as reducing the useful lifetime of the system. They also complicate the system stability due to the addition of extra poles and zeros in the overall control loop of the SMPS which make designing systems that use opto-coupler circuits more complicated, more costly and physically larger. Similarly, inductive coupling may be used in place of opto-couplers and whilst more reliable and accurate are costly in terms of area/volume and can also suffer significantly from interference.

Accordingly, to avoid the need for isolated feedback devices and other reasons, some switched mode power supply configurations have emerged that use what is termed primary side regulation. In primary side regulation, only quantities that are available on the primary side are measured. From these measurements, an inference or estimate of the output quantities is made. Primary side regulation removes the requirement for an opto-coupler to feed back secondary side quantities across the isolation barrier to the primary side while still maintaining the galvanic isolation. A disadvantage of these systems is that they may require complex manipulations of the primary side quantities (resulting in a commensurately complex implementation) and/or rely on a specific mode of operation (DCM) to work properly as they generally require that the transformer is reset on each cycle (de-energised). Moreover, they can be inaccurate in estimating the output quantities due to the complexity of the calculations required leading to a wide variability in performance between individual realisations of the same implementation.

Primary side control schemes take measurements on the primary side. Typically, they use an auxiliary winding on the transformer as a sensor to indicate the state of the transformer. Using the measurements from the auxiliary winding with those from the primary side, one is able to effectively infer or estimate the output quantities, thus removing the requirement for an opto-coupler to relay the secondary side feedback quantities across the isolation barrier to the primary side, while still maintaining the galvanic isolation. For isolated current drivers it is desirable to accurately control the output current. These systems may require complex manipulations of the primary side quantities and can be inaccurate in estimating the output quantities due to the complexity of the calculations required leading to a wide variability in performance or may rely on a specific mode of operation (DCM) to work (which can compromise the design in terms of overall performance metrics such as cost, reliability, efficiency and EMI)

The use of a peak control is effective but requires that the circuit be operating in DCM, i.e. that the energy in the transformer is completely discharged, as otherwise residual energy can introduce errors. There is therefore a need for a control scheme that permits regulation of the output quantities through primary side control that is not restricted to DCM and does not rely on complex manipulations of the primary side values.

The present application addresses this and other problems.

SUMMARY

The present application provides a controller, a switch mode power supply, method and lighting device in accordance with the claims which follow.

DESCRIPTION OF DRAWINGS

The present application will now be described with reference to the drawings in which.

DETAILED DESCRIPTION

The present application provides a methodology for achieving primary side control of a secondary side output in an SMPS converter. An advantage of the methodology is that it permits primary side control of the secondary side output current for all modes (CCM, BCM & DCM) of operation.

Figure 1:
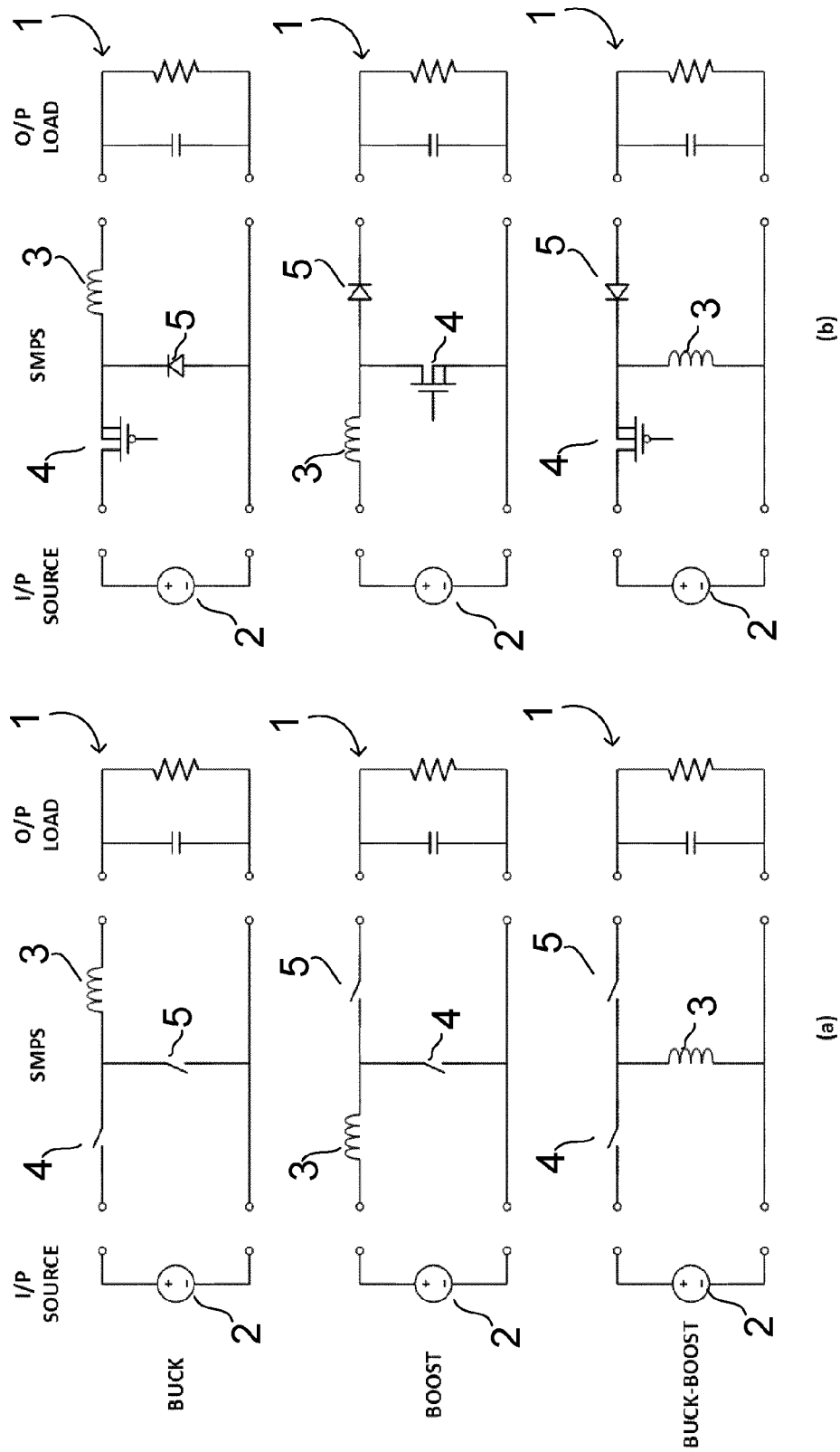
FIG. 1 illustrates exemplary SMPS circuit topologies known in the art, specifically an example of a Buck, a Boost and the Buck-Boost topologies.
Figure 2:
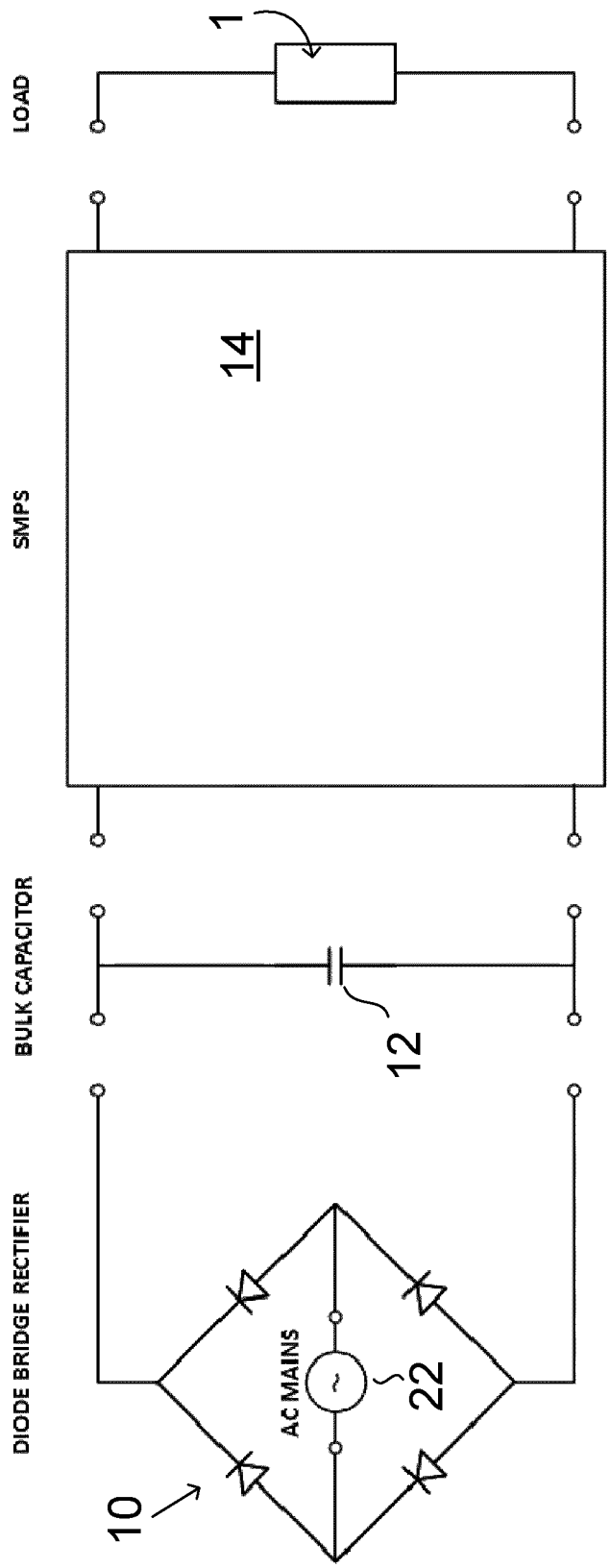
FIG. 2 is a schematic representation of an offline AC-DC SMPS known in the art.
Figure 3:
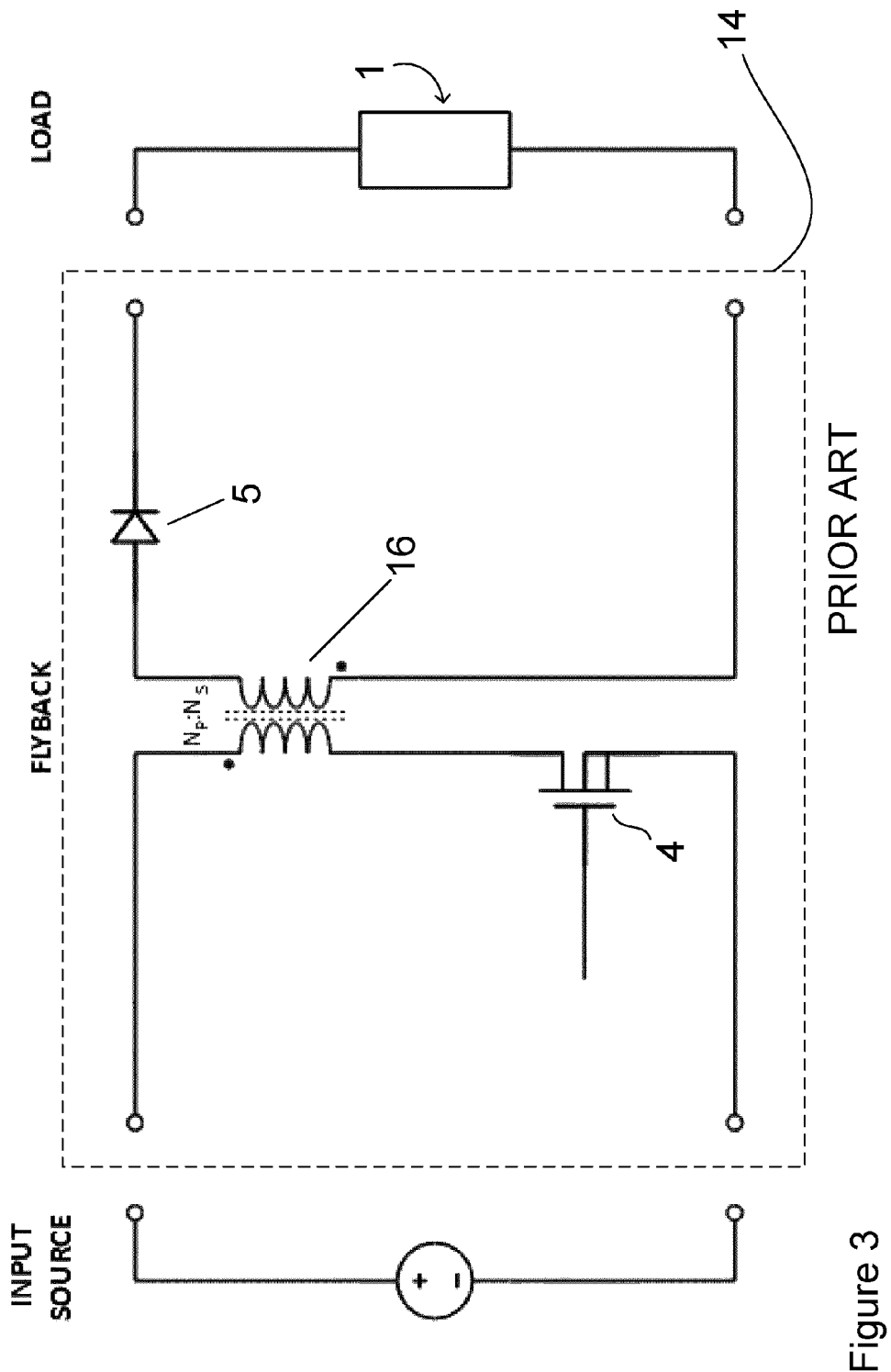
FIG. 3 is an exemplary schematic illustrating a Flyback converter topology 14 known in the art suitable for use in the arrangement of FIG. 2.
Figure 4:
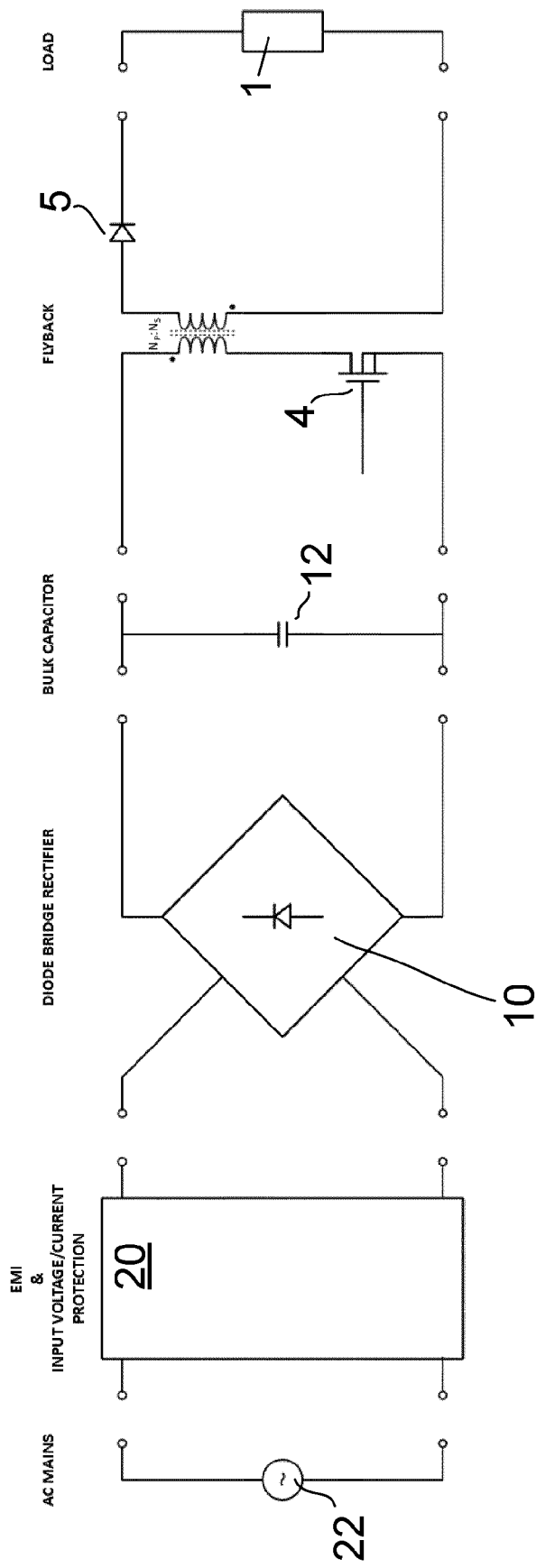
FIG. 4 is an exemplary schematic illustrating a Flyback converter based offline AC-DC SMPS converter including EMI and protection circuitry 20.
Figure 5:
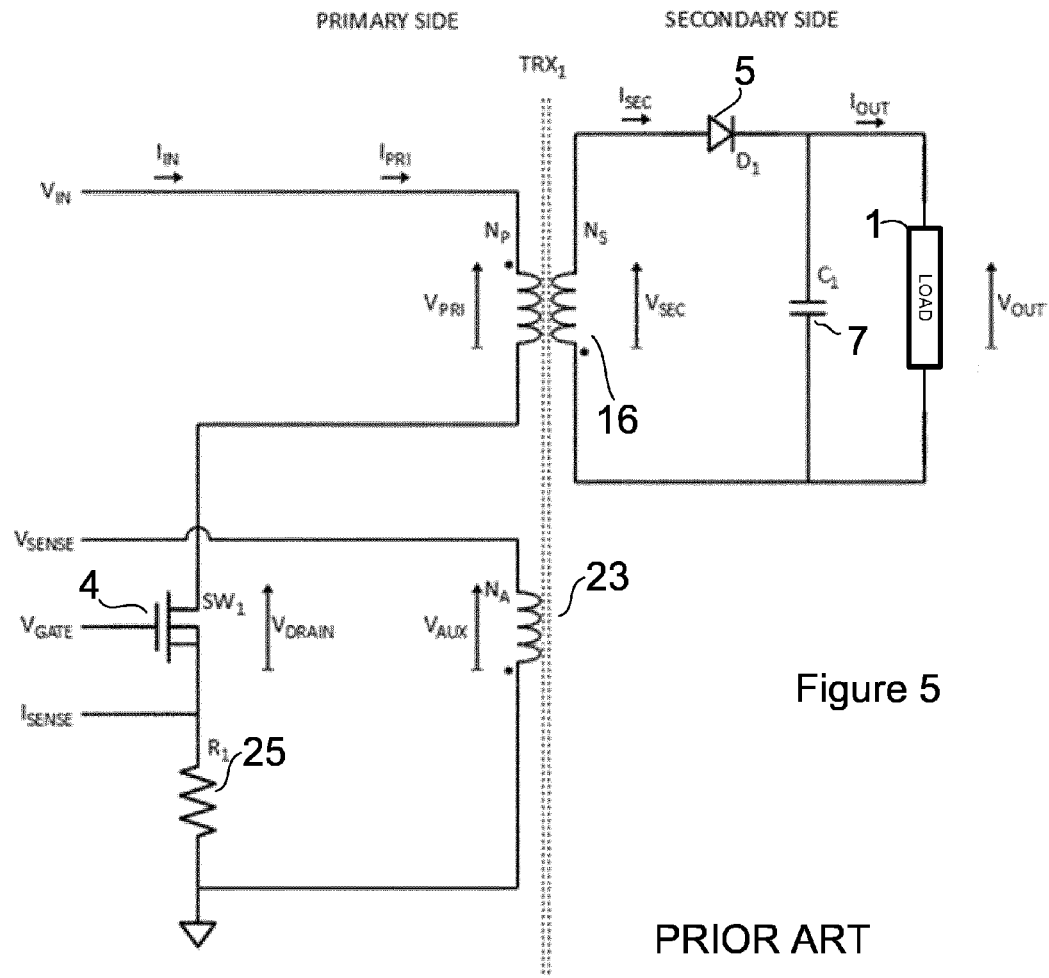
FIG. 5 is an exemplary circuit for a Flyback converter 16 known in the art and suitable for use in the present application.

The methodology of the present application will now be described with reference a prior art peak current measurement technique in the flyback topology converter of FIG. 5 in which an input voltage ($V_{in}$) and current ($I_{in}$) are converted to an output voltage voltage ($V_{out}$) and current ($I_{out}$). The exemplary converter comprises a transformer ($TRX_1$) 16 with primary and secondary windings. The primary winding is switchably connected by a switch $SW_1$ 4, which may be a MOSFET or other semiconductor switch, to an input voltage. Depending on the whether the switch is on or not the input voltage is effectively connected or disconnected across the primary winding. The switch $SW_1$ 4 in turn is controlled by a controller (not shown). In the case where the switch 4 is a MOSFET, the controller provides a drive signal to the gate of the MOSFET. A current sensing circuit is employed to provide a measure $I_{sense}$ of the primary (input) current $I_{pri}$. The current sensing circuit may for example comprise a small sense resistor $R_1$ 25 in series with the switch ($Sw_1$), the voltage across which may be measured to provide a measure $I_{sense}$ of primary current. The secondary winding provides a secondary output ($V_{sec}$, $I_{sec}$) which is connected through a switch suitably a diode ($D_1$) 5 to the load 1, which may for example be one or more LEDs ($LED_{1-n}$) in series. A capacitor ($C_1$) 7 may be provided to smooth the output to the load 1. A sense (auxiliary) winding 23 is also provided on the primary side of transformer 16. The voltage ($V_{aux}$) on the sense winding 23 provides an indication $V_{sense}$ of the state of the secondary winding, i.e. whether it is energised or not. The dotted lines represent the isolation barrier provided by the transformer ($TRX_1$) 16.

Figure 6:
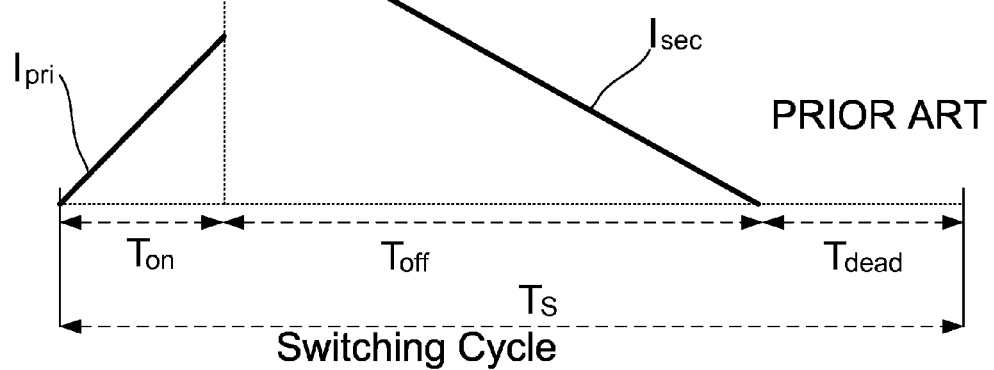
FIG. 6 illustrates exemplary waveforms for the primary and secondary side currents of the flyback converter of FIG. 5, when operating in discontinuous conduction mode (DCM)

An exemplary cycle of the converter, when operating in DCM, is shown in FIG. 6. The prior art method of controlling the output based on peak primary current will now be explained.

In particular, it will be appreciated that a current in the secondary winding of the transformer 16 only flows during the period $T_{off}$. This period corresponds to when the primary side is switched off and the transformer magnetics are de-energising as current from the secondary winding. No current flows in the secondary winding when the primary winding is on or when the transformer 16 is de-energised ($T_{dead}$). The average secondary current may therefore be taken as:

$\frac{1}{2} I_{peak\text{-}sec}(T_{off}/T_S)$, where $I_{peak\text{-}sec}$ is the peak secondary current.

The switching cycle duration ($T_s$) is determined by the controller or a timer associated with it and hence known or at least is measurable on the primary side. The end of the period $T_{off}$ may be calculated from measurements on the output of the sense winding 23. The start of $T_{off}$ may also be measured from the sense winding 23. However, as it coincides with the ending of $T_{on}$ it may also thus be obtained directly.

Whilst a direct measurement of $I_{peak\text{-}sec}$ is not possible, it will be appreciated that a measurement of $I_{peak\text{-}pri}$ is available from the sense resistor $R_1$ 25 by taking a measurement at the end of $T_{on}$. Moreover, a measurement may be implicitly taken, i.e. where the switch is left on until a desired input current has been reached. In either event, $I_{peak\text{-}sec}$ may be calculated as:

$$I_{peak\text{-}sec} = I_{peak\text{-}pri} N_p / N_s \quad (1)$$

where $N_p$ is the number of turns of the primary winding and $N_s$ is the number of turns on the secondary winding.

So that the average output current may be taken as:

$$I_{out} = \frac{1}{2} I_{peak\text{-}pri}(N_p/N_s)(T_{off}/T_S) \quad (2)$$

Thus the secondary output (average) current may be controlled by virtue of controlling the peak primary current.

Whilst this technique is suitable for use in DCM and allows for primary side control, it relies upon the transformer 16 effectively being reset on each cycle, i.e. DCM. In CCM equation no longer works as there are residual amounts of energy in the transformer 16 which mean that the equation is no longer effective to indicate the average secondary current. As a result and as explained above, offline flyback SMPS designs are limited to DCM mode, which is undesirable.

The present application solves this problem by effecting control about the mid-point of the on time so that it is the centre current rather than the peak current that is controlled. By controlling about the centre or mid point current, the average current is controlled correctly in DCM, BCM and CCM modes. This will be explained by reference to the exemplary CCM waveforms of FIG. 7. In this method of control, the current at the mid point is employed rather than the peak current. By using the mid point current, the errors introduced by the residual energy in the transformer which occur in the peak current method are effectively cancelled. Or stated in simple geometric terms, the prior art method is based on the premise that the waveforms are triangular in nature and that accordingly the measurement corresponds to ½ the peak value by the duration. When the waveform is no longer triangular in nature, the equation breaks down. By using the mid point, it will be appreciated that the present method works for both the triangular waveforms of DCM and the trapezoid shape that arises in CCM and so the average output current is now determined as:

$$I_{out} = I_{pri\,mid\,pri} N_p/N_s (T_{off}/T_S) \quad (3)$$

The present application will now be explained further with reference to two exemplary methods of centre point control. In the first, a measurement is made at the centre point of $T_{on}$ which is used as a feedback signal to the controller which in turn determines the value of $T_{on}$ for the next switching cycle. This method will be referred to herein as the center sampled method. In the second method of measurement, the controller measures the time after turning on the primary switch 4 that it takes for the input current to reach a desired level for the mid point to achieve a desired output. Once this current is reached, the primary switch 4 is left on for the same time period as measured, i.e. the time taken to reach the mid point is measured and then effected by leaving the switch on for the same period again. This second method will be referred to herein as the center set method.

Figure 7:
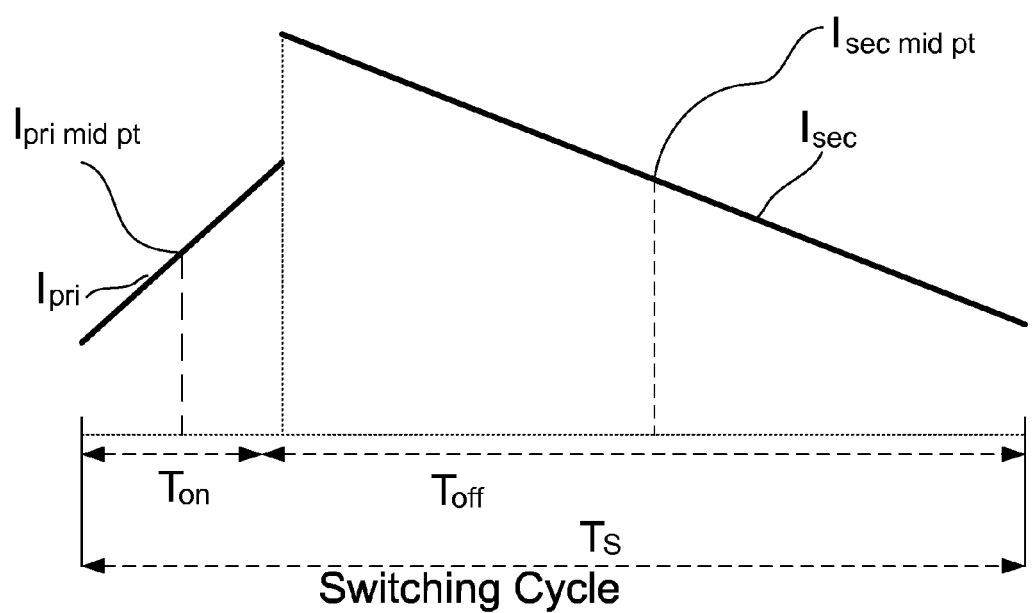
FIG. 7 illustrates exemplary waveforms for the primary and secondary side currents of the flyback converter of FIG. 5, when operating in accordance with an embodiment of the present application.

Alternatively stated, control of the output current is achieved by controlling the value of the primary side current ($I_{C,PRI}$) at the center of the on cycle ($t=\frac{1}{2} T_{ON}$) in such a way so as to keep the center sampled or center set current ($I_{C,PRI}$) at the primary side multiplied by the off time ($T_{OFF}$) divided by the switching period ($T_S$) constant, which per equation 3 above and referring to FIG. 7 results that the output current ($I_{OUT}$) from the SMPS is equal to the secondary current ($I_{SEC}$) averaged over one switching period ($T_S$) i.e. $I_{SEC,AVG}$. It will be appreciated that this method may be implemented solely by monitoring quantities available on the primary side, thus avoiding the problems associated with opto couplers and like devices.

The method will now be described with respect to two exemplary modes described above, i.e. center set and center sampled, which each use the center value of the primary side current ($I_{C,PRI}$) to control the output current ($I_{OUT}$).

The first mode (center set) involves setting a center value of the primary side current ($I_{C,PRI}$) against which the primary side current is compared from which the on time ($T_{ON}$) is effectively set. This results in an off time ($T_{OFF}$) from which the output current ($I_{OUT}$) may be estimated and an error current calculated which may then be used to adjust the set center value of primary side current ($I_{C,PRI}$). The second mode (center sampled) involves sampling ($I_{C,PRI}$) the primary current mid way through the on time, estimating the output current $I_{OUT,EST}$ from this measurement, comparing it to a desired $I_{OUT}$ ($I_{OUT,SET}$) from which an error signal is generated and then used to adjust the value of on time ($T_{ON}$).

Figure 8:
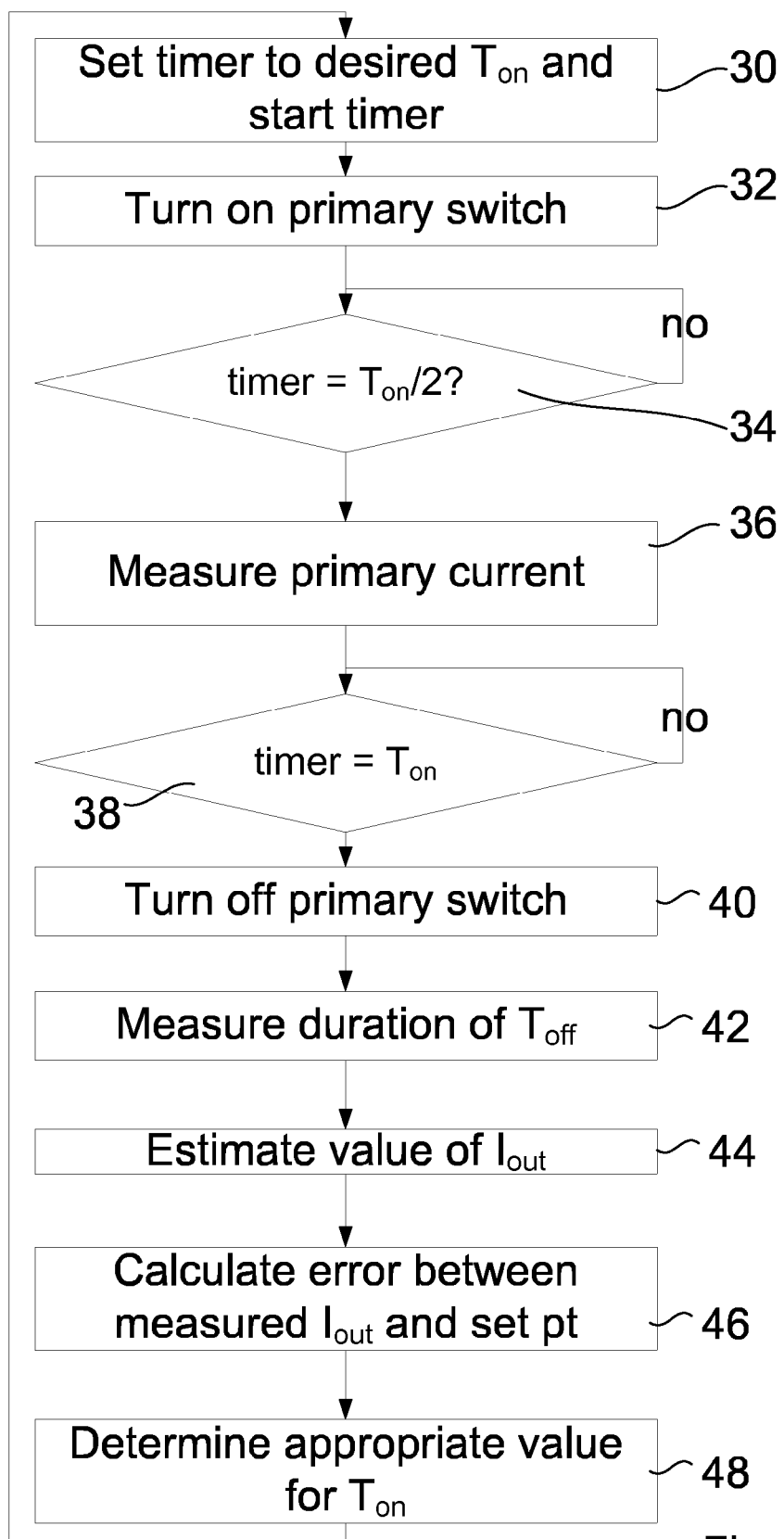
FIG. 8 is a flow chart for an exemplary first method of the present application.
Figure 9:
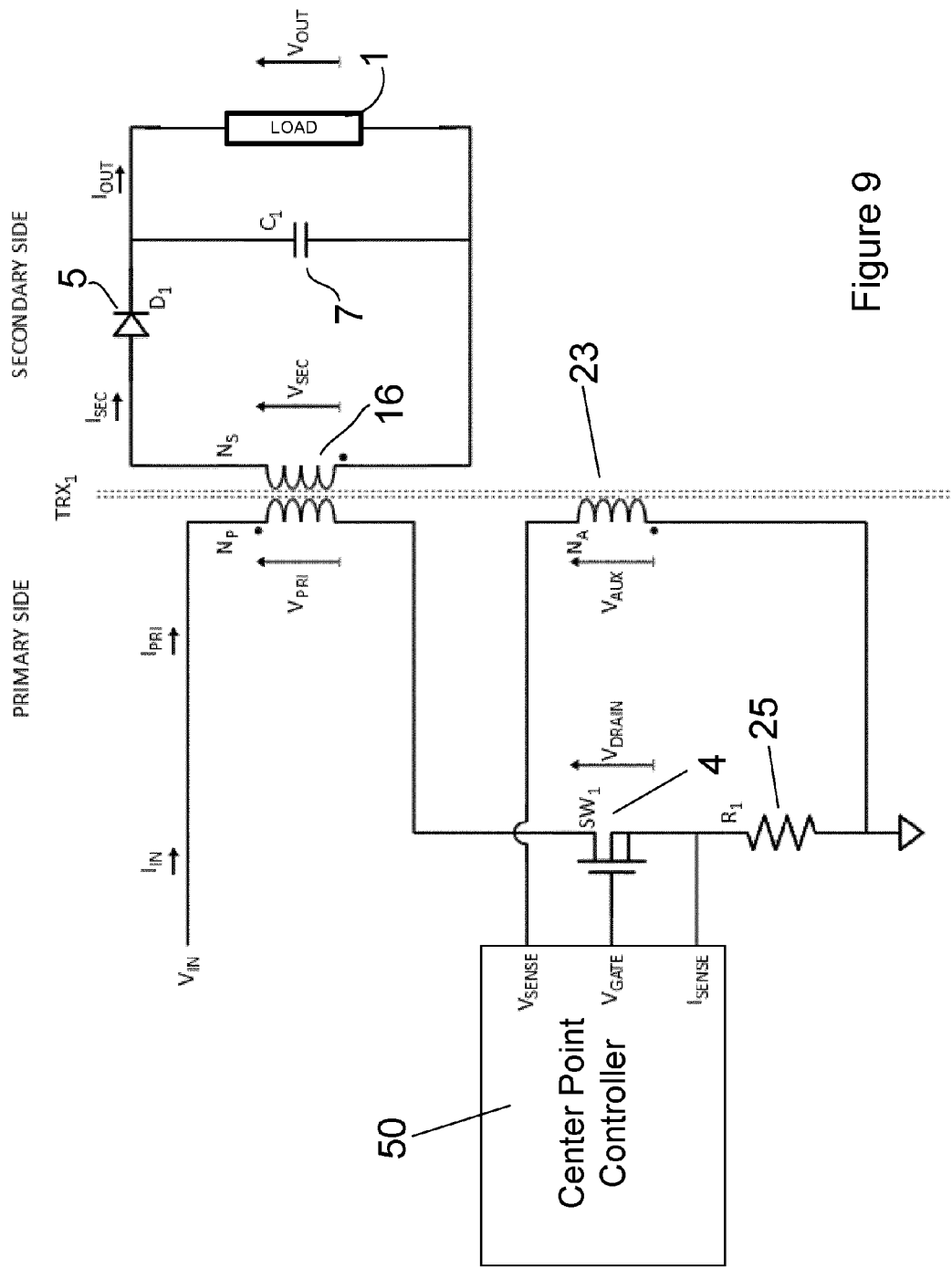
FIG. 9 is a first circuit of the present application.

The first implementation will now be described in greater detail with respect to the exemplary flowchart of FIG. 8 as applied to the flyback topology of FIG. 9 in which a center based controller is used to control the previously described flyback topology of FIG. 5.

The method represents the events of a switching cycle. The method commences with the setting 30 of a timer to the required duration of on-time as determined from the previous switching cycle. As the timer is started, the primary switch ($Sw_1$) 4 is switched on 32 by application of an appropriate switching signal ($V_{gate}$) from the center point controller.

The timer value is monitored 34 to determine when the mid point of the on period has been reached. At the mid point, a measure 36 of input current is obtained ($I_{sense}$). When the required duration for the on period has been reached the primary switch 4 is turned off 40. A timer is started to measure 42 the duration of the off period which may be determined by measurements of the voltage from the auxiliary winding ($V_{sense}$) 23. It will be appreciated that when the converter is operating in BCM or CCM mode, the value of the off period ($T_{off}$) may be determined by substracting the on-time ($T_{on}$) from the cycle duration ($T_s$). An estimate 44 of the average output current may then be determined using equation 3 from above. This estimate is then compared with a desired level of output current, i.e. the set point to provide an error signal 46 representing the difference. The error signal may then be employed to determine 48 the value of on time for the next switching cycle.

The second implementation, center set, will now be described in greater detail with respect to the exemplary flowchart of FIG. 10 as applied to the flyback topology of FIG. 9 in which a center based controller is used to control the previously described flyback topology of FIG. 5. It will be understood that the same arrangement as FIG. 8 may be employed as it is the configuration of the controller that changes rather than the switching topology. The method operates to ensure that a desired mid point current is reached.

Figure 10:
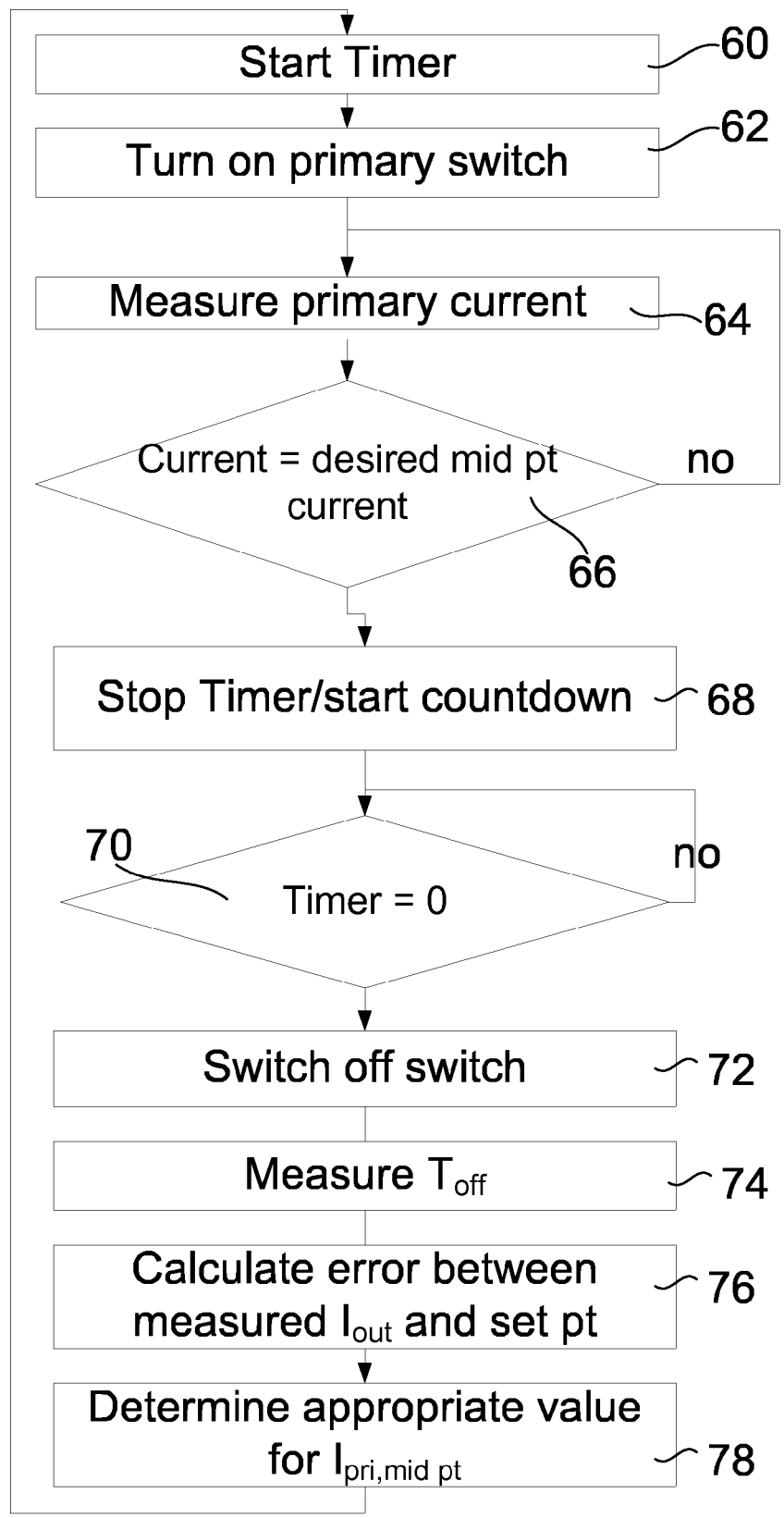
FIG. 10 is a flow chart of an exemplary second method of the present application.

The method shown in FIG. 10 represents the events of a switching cycle. The method commences with a desired value of mid point current determined from the previous switching cycle. At the start of the switching cycle, a timer is reset and started 60 and the primary switch ($Sw_1$) is switched on 62 by application of an appropriate switching signal ($V_{gate}$) from the center point controller.

As the cycle progresses, the timer counts up. At the same time, a measure 64 ($I_{sense}$) of primary current is obtained and compared 66 with the desired value for the mid-point current. When the desired value of mid-point current for is reached, the timer is stopped. Thus the timer is effectively at $T_{on}/2$. The timer is then set 68 to countdown to zero. The timer value is then monitored 70 to determine when it is zero i.e. at $T_{on}$, at which point, the primary switch is turned off 72. A timer is started to measure 74 the duration of the off period which may be determined by measurements of the voltage from the auxiliary winding ($V_{sense}$) 23. It will be appreciated that when the converter is operating in BCM or CCM mode, the value of the off period ($T_{off}$) may be determined by substracting the on-time ($T_{on}$) from the cycle duration ($T_s$). An estimate of the average output current may then be determined using equation 3 from above. This estimate is then compared 76 with a desired level of output current, i.e. the set point to provide an error signal representing the difference. The error signal may then be employed to determine 78 the value of primary mid point current for the next switching cycle.

It will be appreciated that the controller may be implemented in either digital or analog form or indeed a combination of the two. It will further be appreciated that the controller may be implemented using discrete components or within an integrated circuit such as an ASIC or a combination of both. In the case, where the controller is provided in integrated circuit, it will be appreciated that other components including for example the sense resistor and switch ($Sw_1$) may also be provided in the same integrated circuit.

For the purposes of further explanation, some exemplary implementations will now be described for each of the current sampled and current set methods described above. In particular, and with reference to the exemplary circuit of FIG. 11, which provides a center sampled configuration using a flyback topology, in which a transformer 16 is provided to isolate the primary side from the secondary side. The primary winding is switchably connected to an input supply by a switch 4, which is suitably a semiconductor switch, for example a MOSFET.

A secondary side winding is connected through a switch, for example a diode 5, to a load. A capacitor 7 may be provided to smooth the output from the secondary winding as would be familiar to those skilled in the art.

A primary side "auxiliary" winding 23 is employed to provide an indication of when the secondary side winding is de-energised. The output from the auxiliary winding 23 is passed to a suitable detection circuit 50, for example a Zero Crossing Detection Circuit, which converts the winding signal to a suitable digital signal indicating when a transition has occurred. The signal from the Zero Detection Circuit is in turn passed to an estimating circuit. A sense resistor 25 is provided between the Switch $S_{w1}$ 4 and ground. An Analog to Digital Converter is provided to obtain a measurement of the voltage across the sense resistor 4, which in turn provides an indication of the primary winding current. The Analog to Digital Converter (ADC) is controlled by a timing signal $T_{sample}$. The output from the ADC is provided to the estimating circuit. The cycle time $T_s$, which may be generated by a clock circuit (not shown), is also provided to the estimation circuit. The estimation circuit provides an indication of what the output current $I_{o,est}$ is using the previously described equation 3. This estimate of output current is compared in an error measurement circuit to a setpoint $I_{o,set}$ and a resulting error signal is provided to a compensator circuit, which may for example be a proportional integral derivative (PID) compensator. The compensator in turn determines a suitable on time $T_{on}$ to compensate for the error signal. The determined on time $T_{on}$ is in turn provided to a timing circuit which generates an appropriate switching signal for the switch 4 based on the determined value of $T_{on}$. It will be appreciated that this on-time is synchronised with the cycle time signal $T_s$. The timing circuit also generates the sample signal $T_{sample}$ half way through the on-time. This signal $T_{sample}$ is used to trigger the ADC so that the value of primary current acquired by the ADC corresponds to the mid-point current. It will be appreciated that some or all of the components of the estimator, ZCD, compensator, error measurement circuit, timing circuit, MOSFET, sense resistor and ADC may all be provided in one integrated circuit.

A second implementation providing for center setting of current, sets the mid point current rather than performing control based on a sample taken at mid point per the first implementation. This second implementation, with reference to FIG. 12, as before is directed to a flyback converter under the control of a switch ($Sw_1$) 4. In this arrangement, a timing circuit is used to provide a switching signal ($V_{gate}$) to the switch 4. A detection circuit, such as for example a zero crossing detection circuit as per the first implementation, is used to provide an indication of when the secondary winding is conducting. The change in the status of this indication may be employed using a timer or similar device to measure the off time ($T_{off}$) which is provided to an estimating circuit. The estimating circuit using $T_{off}$, the cycle time $T_s$, the primary current at the mid point $I_{c,pri}$ in the current cycle (which is known for reasons which become apparent below) and the value of $T_s$ (which is generally known or measurable) provides an estimate of the secondary side output current. It will be appreciated that as with the other implementation, the value of the turns ratio of the transformer 16 is also required. However, as it is a constant value, it merely provides a scaling value. Techniques for inputting a scaling value in an electronic circuit would be familiar to those in the art including for example, hardcoding the value in the estimator (controller) or soft programming it in an erasable memory such as an EEPROM, or using another technique such as programming resistors to set the value. The resulting estimate of output current is compared in an error measuring circuit to a desired set point $I_{out,set}$ and a resulting error signal produced, which in turn is provided to a compensator circuit. The compensator may for example be a PID circuit. The compensator circuit produces a signal identifying the required mid point current for the next cycle. This signal in turn is fed back to the estimating circuit as the value of the primary mid point current during the next cycle. The required mid point current is provided to a DAC and converted to an analog equivalent. A comparator is used to compare the required mid point primary current with the actual primary current.

A timing circuit is provided comprising an up/down counter which is reset at the start of a switching period and starts to count up accordingly in response to a clock signal (not shown) as the primary switch $Sw_1$ 4 is turned on. It will be appreciated that the required resolution for the counter is dependent on the ratio between the switching cycle duration and the clock speed. A comparator is employed to detect the point where the primary current equals the required mid point current. At this point, a down signal is provided by the comparator to the timing circuit, which causes the counter to stop counting up and to start counting down from its current value. When the counter reaches zero, the switching signal to the switch 4 is turned off. These steps are repeated each cycle.

It will be appreciated, that by virtue of the counter counting up until a desired mid point current value is reached and then counting down afterwards, the position of the mid point current is set. As with the first implementation, other measurements may be taken. For example measurements of the on time $T_{on}$, and the dead time $T_{dead}$, may also be made for providing additional control functionality to the circuit. An example would be in a DCM mode of operation, where the dead time may be modulated (by advancing or delaying the start of the next cycle) so as to achieve quasi resonant operation, or additionally to implement valley skipping techniques under light load conditions so as to improve conversion efficiency. Similarly, the control circuitry may be configured with other elements to provide other functionality such as for example, "soft start", "over current" protection or power factor correction. It will be understood from the foregoing description that the techniques and circuits described herein operate by controlling a switching circuit about the mid-point of the on-time of a switch in the switching circuit. It will be appreciated by those skilled in the art that there may be delays between a control signal generated internally in the control circuit and the actual response of the switching element to this control signal owing, for example, to delays through drive circuitry or RC delays due to gate capacitances in the switch. Thus, when the control circuit issues an internal control signal to turn on a switch in the switching circuit, there may be a delay before the switch turns on. Similarly, when the control signal issues an internal control signal to turn off the switch, there may be a delay before the switch turn off. Depending on the particular design of the switching circuit these delays may be insignificant and ignored. Nonetheless, it will be appreciated that if the values of the delays are known, the control circuit may adjust its point of operation to ensure that control is effected at the mid point of the switching cycle.

Figure 14:
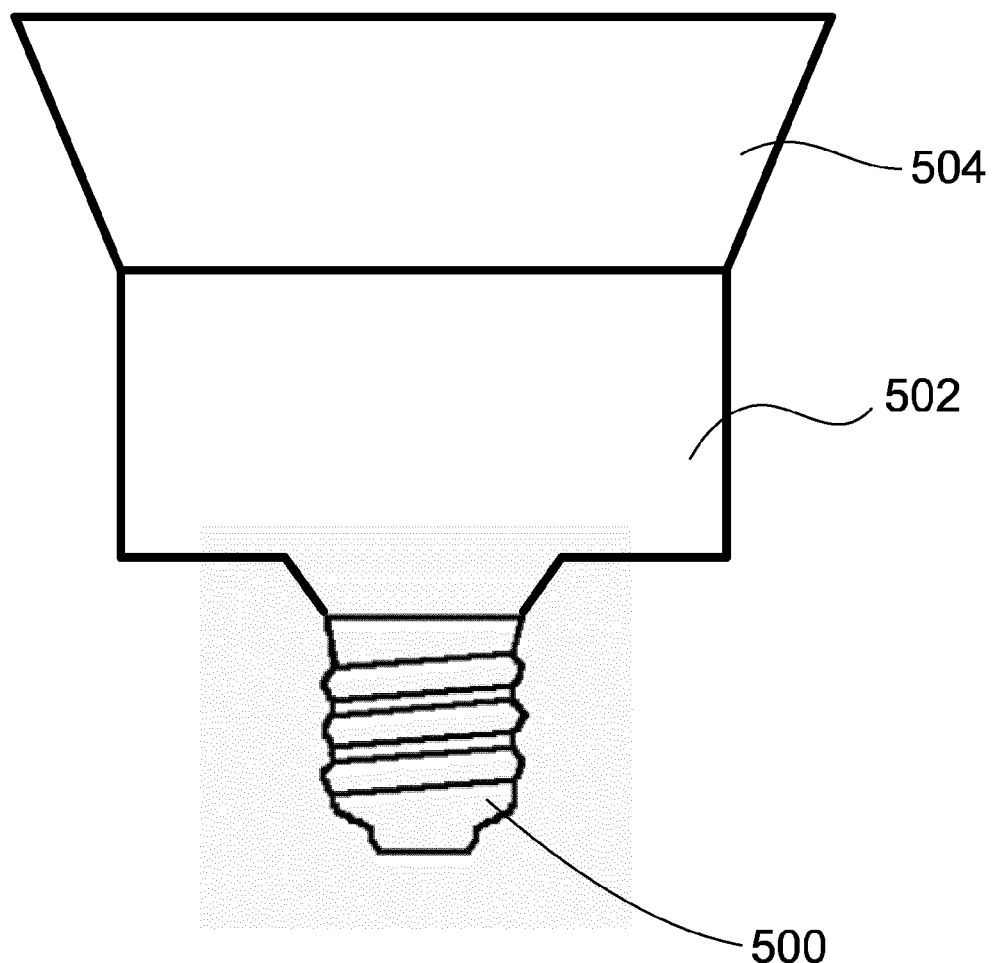
FIG. 14 is an LED light bulb according to a further aspect of this application.

An exemplary arrangement for determining the on-time delay is shown in FIG. 14. In this arrangement, a timer 94 is provided for measuring the delay. The timer 94 is started by a control signal from the controller 90 indicating that the switch is to be turned on. As would be familiar to those in the art, the control signal is not applied directly to switch but through an appropriate drive circuit 92. The output from the drive circuit 92 is connected to the gate, and thus employed to control the switch 4. A comparator 96 is provided, which has as one input a measure of the voltage on the gate. This gate voltage is compared in the comparator 96 with a threshold value Von-set to determine when the gate has turned on. Once the comparator 96 has detected that the gate voltage has reached the threshold, the comparator's 96 output changes causing a stop signal to be sent to the timer 94. At which point the timer value provides a measure $T_{on\text{-}delay}$ of the delay in turning on the switch 4. This measure may be employed by the controller 90 to ensure it operates about the mid point. A second similar arrangement (not shown) may be employed to measure the delay $T_{off\text{-}delay}$ in the switch 4 turning off. Except, in this case, the timer 94 will be triggered to start by the control signal going off and triggered to stop by the gate voltage falling below a predetermined threshold. The predetermined threshold used for measuring the point at which the switch 4 turns on and the predetermined level used to determine when the switch 4 turns off may be the same or different. Depending on the particular application and design of the switching circuit, the measurement of the delays may be performed once during an initial calibration phase.

Figure 11:
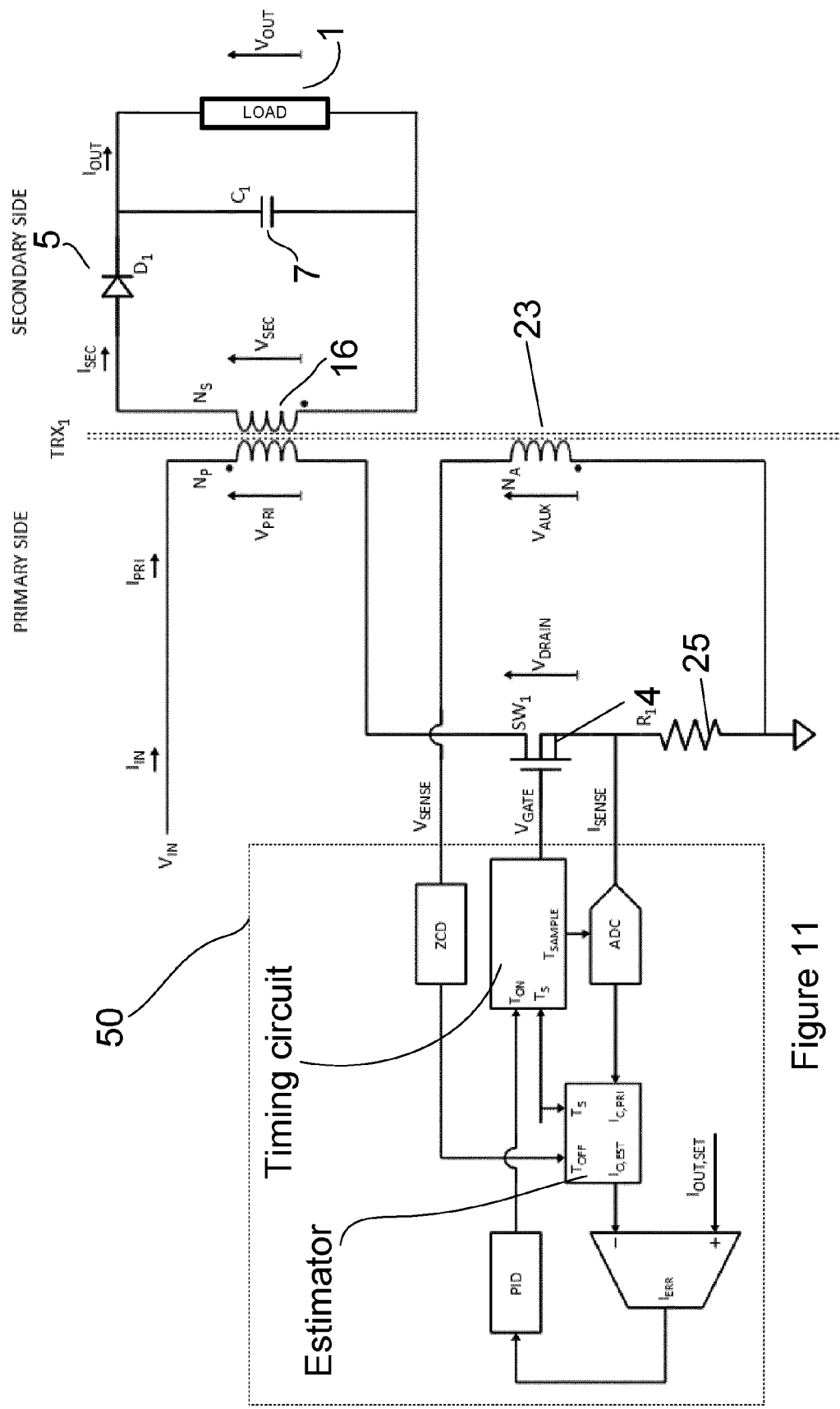
FIG. 11 is a second circuit of the present application.
Figure 12:
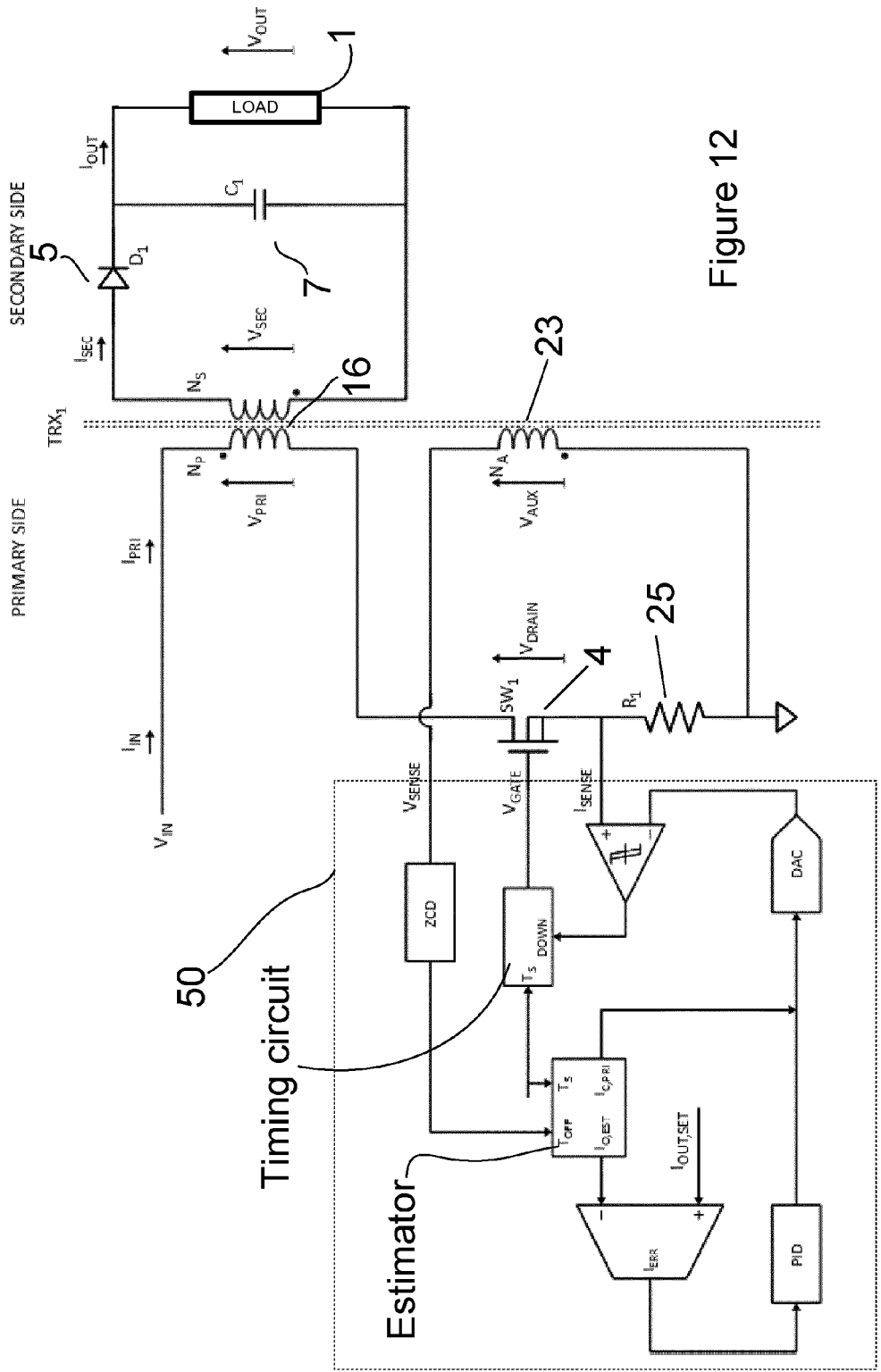
FIG. 12 is a third circuit of the present application.
Figure 13:
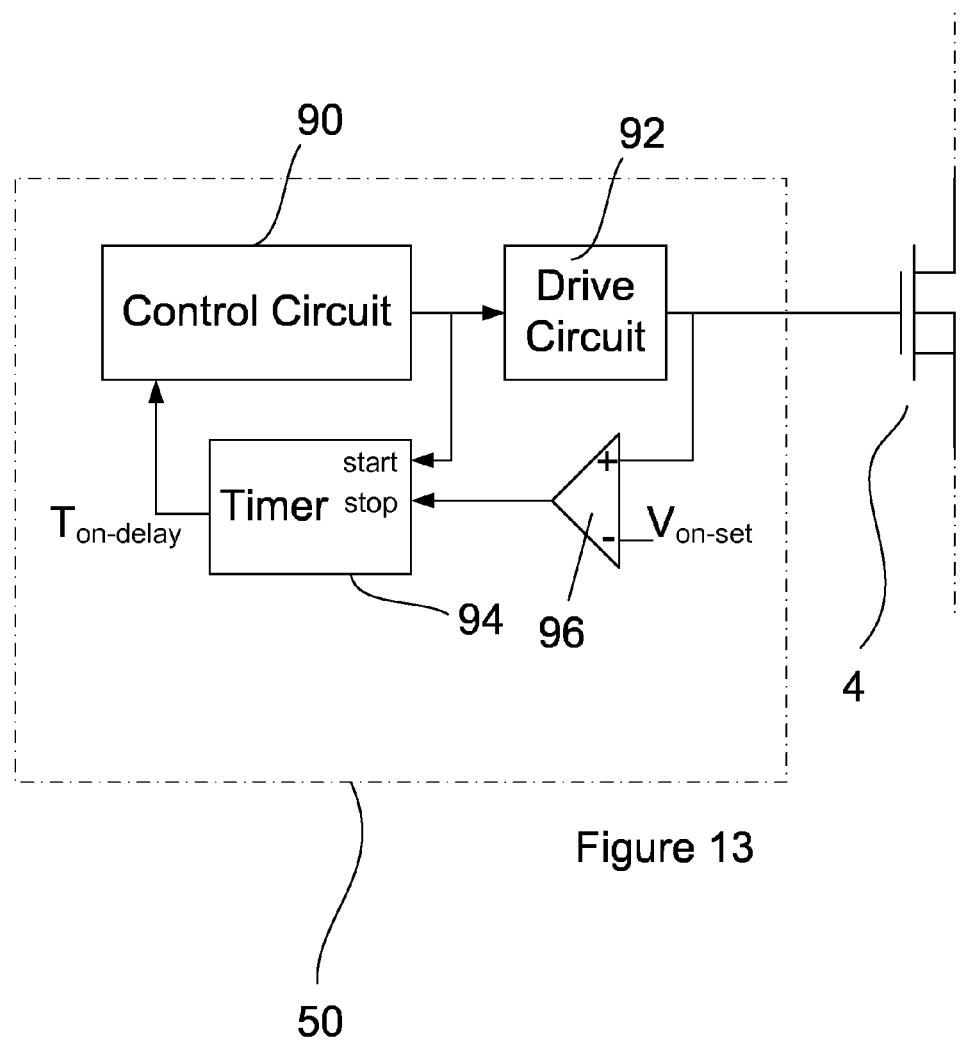
FIG. 13 shows an exemplary arrangement for determining on-time delay.

However, as the value of the delay may be dependent on external parameters such as the supply voltage, a more appropriate method may be to continually determine values for the on and off delay values $T_{on\text{-}delay}$, $T_{off\text{-}delay}$ and where the values determined during one switching cycle are used by the controller 90 in adjusting the mid point in a subsequent cycle. More specifically, it will be appreciated that the mid point as seen by the switch circuit differs from that of control circuit by a time of $T_{offset}$ which equates to: $(T_{on\text{-}delay}+T_{off\text{-}delay})/2$. Thus the control circuit may be configured to operate about its midpoint offset by a time of $T_{offset}$. Where the delays are similar in value, it will be appreciated that only one may be required to be measured. In the arrangement of FIG. 11, this may be achieved by delaying $T_{sample}$ by $T_{offset}$. In the arrangement of FIG. 12, this may be achieved by adjusting the value to be counted down by an amount equating to $(T_{on\text{-}delay}-T_{off\text{-}delay})/2$ as it is the difference in the delays rather than the absolute values of the delays that is relevant as the delay $T_{on\text{-}delay}$ from turning on is effectively already accounted by virtue of using the measurement of $I_{sense}$ to set the mid point. Clearly, if the values of $T_{on\text{-}delay}$ and $T_{off\text{-}delay}$ are similar, no adjustment is required.

Whilst the above examples, equations and circuits have been explained with reference to a flyback converter, the techniques, methods and circuits described are not so restricted. The methods may also be used in other topologies including non-isolated ones. It will be appreciated that depending on the topology, that a scaling factor or other modification may be required when implementing the method in a circuit.

Similarly, it will be appreciated that whilst the present application has been described generally with respect to an offline SMPS that it may equally be employed in a non offline converter, for example a battery supplied DC-DC converter. Equally, whilst the present application has been described with reference to operating in all conduction modes, i.e. DCM, BCM and CCM that it may be used in just one or more of these modes. The present application has been described generally with respect to providing DC power to a load, and is not restricted to any one particular application and is suitable for a wide variety of loads.

One exemplary application is when an SMPS is employed to provide a constant current to a load, for example in the case where the SMPS is used as a LED driver circuit. Demand for LED lighting has increased rapidly in recent years as there has been and continues to be a huge push globally to move away from traditional incandescent lighting (where only about 5% of the input power is converted to visible light) to more energy efficient sources of light, such as LEDs.

At the heart of a LED based luminaire or lamp is at least one HB LED (High Brightness Light Emitting Diode). A difficulty with LEDs is that they generally require a constant current drive to operate properly. As a result, the input power source (typically AC mains or DC supply bus) needs to be converted to an accurate DC current that can support a range of output voltages dependant on the particular forward voltage of the LED and the number of LEDs that are driven in series. This requirement differs from what is normally required of efficient Switched Mode Power Supplies (SMPS) which are generally designed to supply an accurate DC voltage across a wide range of load currents with good transient response.

One of the accepted advantages of LEDs as a source of illumination is their relatively long lifetime (typically 50,000-100,000 hrs is reported for the LEDs themselves although this is heavily dependent on the operating junction temperature of the LED). When taken in the context of a light bulb or luminaire, this figure reduces (typically 25,000-50,000 hrs) due to the thermal conditions under which the light bulb or luminaire operates although it is still significantly better in comparison to incandescent (typically 750-1,000 hrs) or CFL (typically 5,000-15,000 hrs) bulbs. As a result, one of the key issues with LED lighting is insuring the operating temperature of both the LEDs and the drive electronics components are kept as low as possible to insure maximum lifetime as all these components suffer lifetime degradation at elevated temperatures. The overall lighting efficacy of mains powered LED light bulb or luminaire is the amount of light produced for the power consumed. Efficacy typically measured in lumens per Watt. It will be appreciated that the efficacy is the product of individual efficiencies within the system, namely:

1. the efficiency of the SMPS drive electronics ($\eta_{SMPS}[\%]$)
2. the efficacy of the LEDs (EfficacyLED [lm/W])
3. the optical efficiency of the assembled product ($\eta_{OPTICAL}[\%]$)

It is therefore extremely important in terms of any efficient lighting technology based on HB LEDs that the efficiency of the individual components are as high as possible to insure that adequate lumens can be delivered as efficiently as possible.

As mentioned above, one of the specific issues with HB LED illumination are the thermal requirements to insure maximum lifetime for the light bulb or luminaire. Maximising the efficiency of the SMPS helps in this respect as it reduces the dissipated power in the system meaning that the electronic components and the LEDs run cooler and hence extends the lifetime or alternatively allows a higher light output as the more efficient system can process higher power (and hence deliver more lumens) with the same operating temperature (and hence same lifetime) as a less efficient system. As a result, accurate and consistent control of current provided to the LED's is desirable. The above described methods are particularly suited to this need and where used improve the reliability and efficiency without significant additional cost or components.

Figure 15:
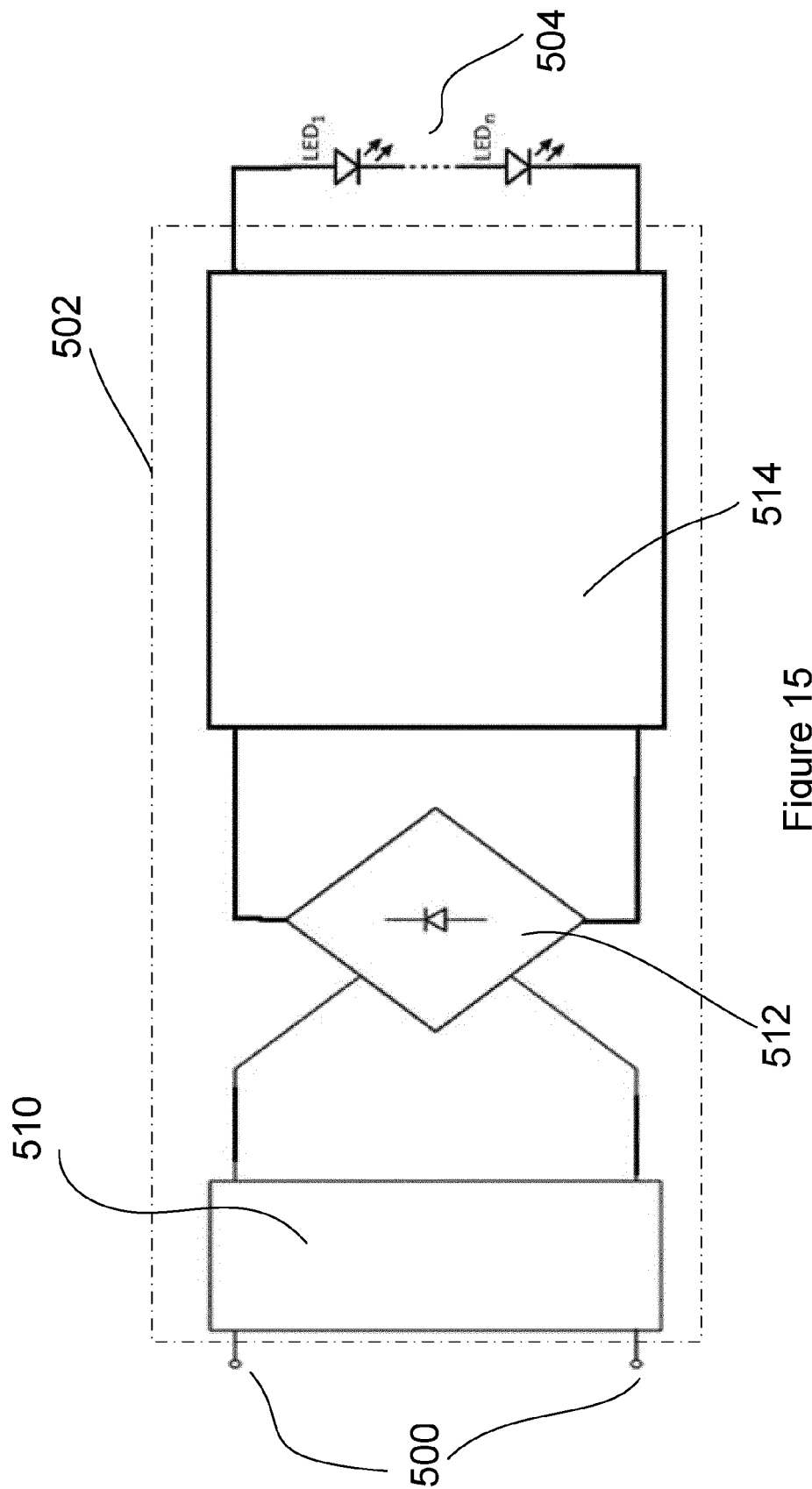
FIG. 15 is a circuit diagram for the light bulb of FIG. 14.

An example of such a LED light or Luminaire, as illustrated in FIG. 14 and equivalent circuit diagram in FIG. 15, comprises a base section (fitting) 500 for engaging with a corresponding light socket in a light fitting. The fitting 500 provides electrical contacts to connect the circuitry of the fitting to the mains electricity. The main body 502 of the light is affixed to the fitting 500 and houses the circuitry of the light. The mains voltage provided by the fitting 500 may initially be connected through a protection device such a thermal overload device or fuse and\or an EMI filter circuit 510. The rectifier circuit 512 is then employed to provide a rectified mains voltage to an SMPS circuit 514. The SMPS circuit which is suitably of the type generally described above provides a drive current to the load, which in this case may be a combination of LED's typically arranged in a series configuration. The LED's are housed in a top section (head) 504 of the light which may also include an arrangement, for example, of lenses and/or reflectors to direct light from the LEDs into the space to be lit.

It will be appreciated that whilst several different embodiments have been described herein, that the features of each may be advantageously combined together in a variety of forms to achieve advantage.

In the foregoing specification, the application has been described with reference to specific examples of embodiments. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present application.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Thus for example references to a controller may be taken to include situations in which the control function is provided by a plurality of discrete elements as well as situations where it is provided as a single device such as an integrated circuit or as part of such an integrated circuit.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of controlling a switched mode power supply to convert an input to an output, the switched mode power supply comprising a transformer having a primary side and a secondary side,
   and a switch on the primary side of the transformer, the method comprising:
   switching the switch on to connect the primary side of the transformer to the input, and
   switching the switch off to disconnect the primary side of the transformer to the input,
   effecting control of the switch at the mid point of the on-time being the period between the switching on of the switch and the switching off of the switch.

2. The method of claim 1, wherein effecting control comprises determining the value of a successive on-time for the switch based on a measurement obtained at the mid point of a previous on-time for the switch.

3. The method of claim 2, wherein the measurement is one of the current on the primary side of the switched mode power supply.

4. The method of claim 2, wherein the on-time is based on an estimate of a value on the secondary side of the switched mode power supply, wherein said estimate is determined from the measurement obtained at the mid point of previous on-time for the switch.

5. The method of claim 4, wherein the estimate is compared to a set point to produce an error signal representative of the difference there between and wherein the error signal is processed to as to provide the successive value for the on time.

6. The method of claim 1, wherein effecting control comprises switching on the switch and waiting a time period until the primary current has reached a desired level and then waiting the same time period before switching off the switch.

7. The method of claim 6, wherein the desired level is a predetermined set value.

8. The method of claim 6, wherein the desired level is obtained by comparing a secondary side estimate with a set-point.

9. The method of claim 8, wherein the secondary side estimate is based upon a measurement of the current on the primary side of the switched mode power supply.

10. The method of claim 1, wherein the comparison results in an error signal representative of the difference between the estimate and the set point and wherein the error signal is processed to provide a desired set point for successive cycles.

11. The method of claim 5, wherein the set point is a predetermined value.

12. The method of claim 5, wherein the set point is a predetermined value modulated by the input voltage to the primary side of the SMPS.

13. A method according to claim 1, wherein the mid-point of the on-time of the switch is determined relative to on-time of a control signal.

14. A method according to claim 13, wherein the relative positioning of the on-time of the switch and the on-time of the control signal is determined by reference to at least one delay between the two.

15. A method according to claim 14, wherein the at least one delay comprises a delay with respect to the start of an 'on-time' on the control signal and the start of the 'on-time' of the switch.

16. A method according to claim 14, wherein the at least one delay comprises a delay with respect to the end of an 'on-time' on the control signal and the end of the 'on-time' of the switch.

17. A controller for effecting control of a switch in a switch mode power supply by providing a switching signal to the switch to cause it to be switched on for an on-time of a switching period, the controller being configured to effect control of the switch at the mid point of the on-time.

18. The controller of claim 17, wherein to effect control at the mid point, the controller determines the value of on-time for the switch for a successive switching period based on a measurement obtained at the mid point of a previous on-time for the switch.

19. The controller of claim 18, wherein the measurement is one of the current on the primary side of the switched mode power supply.

20. The controller of claim 18, wherein the on-time is determined by the controller based on an estimate of a value on the secondary side of the switched mode power supply, wherein said estimate is determined from the measurement obtained at the mid point of a previous on-time for the switch.

21. The controller of claim 17, wherein the controller effects control by switching on the switch and waiting a time period until the primary current has reached a desired level and then waiting the same time period before switching off the switch.

22. The controller of claim 21, wherein the desired level is a predetermined set point.

23. The controller of claim 22, further comprising an estimator for providing an estimate of a value from a secondary side of the SMPS and where, wherein the controller sets the desired level based on a comparison between the output of the estimator and a setpoint.

24. A controller according to claim 17, wherein the controller is configured to generate a control signal to effect the switching signal and where the controller determines the mid-point of the switching signal based on the relative position of the mid-point of the 'on-time' of the control signal.

25. A controller according to claim 24, wherein controller is configured to determine the relative position of the mid-point of the switching signal and the mid-point of the control signal by reference to at least one delay between the two.

26. A controller according to claim 25, further comprising at least one timer for measuring the at least one delay.

27. A controller according to claim 25, wherein the at least one delay comprises a delay with respect to the start of an 'on-time' on the control signal and the start of the 'on-time' of the switch.

28. A controller according to claim 25, wherein the at least one delay comprises a delay with respect to the end of an 'on-time' on the control signal and the end of the 'on-time' of the switch.

29. A controller according to claim 28, further comprising a comparator for determining the start of on-time of the switching signal by comparing the level of the switching signal to a threshold value.

30. A Switched Mode Power Supply (SMPS) for converting an input to an output, the SMPS comprising:
a transformer having a primary side and a secondary side,
a switch for switchably connecting the primary side of the transformer to the input;
a controller for effecting control of a switch in a switch mode power supply by providing a switching signal to the switch to cause it to be switched on for an on-time of a switching period, the controller being configured to effect control of the switch at the mid point of the on-time.

31. The SMPS of claim 30, wherein the SMPS is configured as a flyback converter.

32. The SMPS of claim 30, further comprising a rectifier for rectifying a mains input voltage and providing this mains rectified voltage as the input to the SMPS.

33. The SMPS of claim 30, further comprising a light comprising at least one LED wherein the at least one LED is driven by the output from the SMPS.

34. The SMPS of claim 30, further comprising a luminaire having a connector for engaging with a light socket providing a mains voltage, the luminaire light fitting further comprising an LED driven by the output from the SMPS.

35. A light comprising:
a fitting for engaging with a light socket and receiving mains power,
a main body connected to the fitting and housing electronic circuitry;
a head section comprising at least one LED driven by the electronic circuitry,
wherein the electronic circuitry comprises:
a rectifier circuit for rectifying the received mains power;
an SPMS circuit, for providing a drive current to the at least one LED, comprising a transformer having a primary side and a secondary side with the at least one LED being driven by the secondary side, a switch for switchably connecting the primary side of the transformer to the rectified mains power; wherein the electronic circuitry is configured to effect control of the operation of the switch at the mid point of the on-time of the switch.

* * * * *